Oct. 31, 1967

N. B. UNDERHILL ETAL 3,350,689

MULTIPLE COMPUTER SYSTEM

Filed Feb. 10, 1964

11 Sheets-Sheet 1

INVENTORS
NOEL B. UNDERHILL
FRED C. HYATT
BY
ATTORNEY

Oct. 31, 1967 N. B. UNDERHILL ETAL 3,350,689
MULTIPLE COMPUTER SYSTEM
Filed Feb. 10, 1964 11 Sheets-Sheet 2
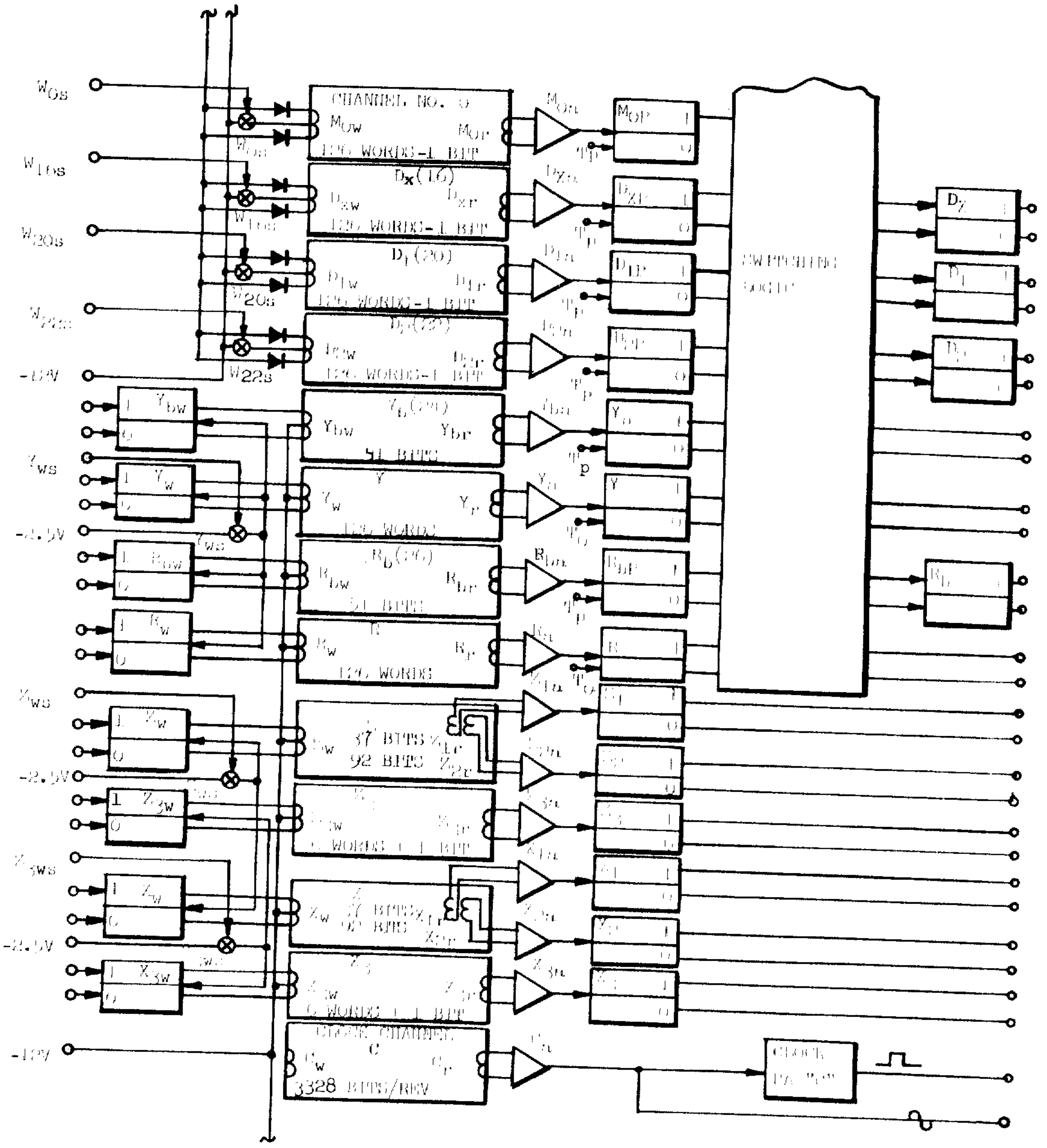
FIG. Ib
INVENTORS
NOEL B. UNDERHILL
FRED C HYATT
BY
L. Lee Humphries
ATTORNEY

MULTIPLE COMPUTER SYSTEM

Filed Feb. 10, 1964

INVENTORS
NOEL B. UNDERHILL
FRED C. HYATT
BY L. Lee Humphries
ATTORNEY

INVENTORS
NOEL B. UNDERHILL
FRED C. HYATT
BY L. Lee Humphries
ATTORNEY

INVENTORS
NOEL B. UNDERHILL
BY FRED C. HYATT

L. Lee Humphries

ATTORNEY

INVENTORS
NOEL B. UNDERHILL
FRED C. HYATT
BY
L. Lee Humphries
ATTORNEY

INVENTORS
NOEL B. UNDERHILL
FRED C. HYATT
BY L. Lee Humphries
ATTORNEY

Oct. 31, 1967 N. B. UNDERHILL ETAL 3,350,689

MULTIPLE COMPUTER SYSTEM

Filed Feb. 10, 1964 11 Sheets-Sheet 8

INVENTORS
NOEL B. UNDERHILL
FRED C. HYATT

BY L. Lee Humphries

ATTORNEY

INVENTORS
NOEL B. UNDERHILL
FRED C. HYATT
BY L. Lee Humphries
ATTORNEY

INVENTORS
NOEL B. UNDERHILL
FRED C. HYATT
BY L. Lee Humphries
ATTORNEY

INVENTORS
NOEL B. UNDERHILL
FRED C. HYATT
BY L. Lee Humphries
ATTORNEY

United States Patent Office 3,350,689

Patented Oct. 31, 1967

3,350,689

MULTIPLE COMPUTER SYSTEM

Noel B. Underhill, Lakewood, and Fred C. Hyatt, La Puente, Calif., assignors to North American Aviation, Inc.

Filed Feb. 10, 1964, Ser. No. 343,840
7 Claims. (Cl. 340—172.5)

This invention relates to a multiple computer system. More specifically it relates to a combination of two or more computers so as to be able to transfer information among such computers. One aspect of this invention is the providing of a data link between two or more digital computers.

Inadequate storage capacity and speed limit the capability of computers in handling problems occurring in business and industry. Usual technological problems are ordinarily solved by a single computer having an average data storage capacity and speed. If additional storage capacity is required, means for storing data such as a magnetic tape storage unit, is often employed with the computer. However, in many instances problems become so complex that increased data storage capacity alone will not overcome the difficulties posed. Since complex problems requiring greater capacity and speed occur less frequently than the day-to-day problems accompanying business or industrial activity, it is not economically feasible to maintain a larger and faster computer for the infrequent complex problems. Instead, it is more feasible to maintain two or more computers just adequate for the day-to-day problems, and to combine their data processing capability for the more complex problems.

It is, therefore, an object of this invention to provide a multiple computer system.

It is, also, an object of this invention to provide means for transferring information from one digital computer into another through a data link.

It is another object of this invention to provide means for transferring information from a selected one of a plurality of computers to another.

It is still a further object of this invention to provide means for interconnecting a plurality of computers through a shift register for exchanging information between selected ones of said computers through said shift register.

Still another object of this invention is to provide a system for controlling the interchange of information between a plurality of digital computers through external registers.

Another object of this invention is to provide a system for exchanging information between one computer and another by sharing control of an external shift register.

Another object of this invention is to provide a system for the simultaneous solution of different parts of a computational problem by a plurality of computers which are joined by a computer information transfer system having means for transferring information from preselected ones of said plurality of computers to other preselected ones of said plurality of computers whereby said computational problem can be completed and combined in a single computer within the time ordinarily required for solving merely one portion of said computational problem.

Still another object of this invention is to provide means for synchronizing memories of computers interconnected by a transfer system at a desired sector relationship.

A still further object of this invention is to provide a transfer system having means alternately controllable by any one of a plurality of computers interconnected by the transfer system for controlling the exchange of information between the computers.

Another object of the invention is to provide a transfer system having means for synchronizing the memories of a plurality of computers interconnected by said system with a desired sector relationship.

In the present invention, two or more digital data handling devices are interconnected to provide for controlled exchange of information so that their combined capacity and speed are increased by a factor related to the number of devices connected. Such devices include recirculating memory type computers. If computers are interconnected, they may be programmed to independently carry out an assigned phase of a problem. As each computer performs its phase of the problem, the results are stored in its memory in the normal manner and immediately made available through a data link to any one of the other computers. Any one of the computers may extract information from the data link or transfer system, depending on how the computers are programmed. Each computer is provided with a sequence control which is synchronized with, but independent of, other computers and each computer time shares control over the data link. The term data link is used herein interchangeably with transfer system.

During an exchange period, while information is being transferred between computers, information is serially shifted from one computer into the data link under the control of that computer. The information is then shifted out of the data link into the receiving computer under the control of that computer. The computers are synchronized prior to initiating a program so that the relative positions between the recirculating memory locations being scanned are aligned. Such alignment between computers facilitates controlled communications between computers through the register.

The data link may be loaded from or interrogated by another digital data handling device designated herein as an external source in a similar manner as from end of the interconnected computers. For example, one of the computers may be programmed to command filling the data link from an external source such as a magnetic tape unit.

The data link also comprises error detecting means. After the individual computers are programmed, a test run may be conducted to check for multiple loads or interrogate commands to the data link simultaneously. If multiple commands are received, lamps become lit and indicate which combination of devices are generating simultaneous commands.

The computer transfer system or data link is comprised of a shift register, and its gating circuits, input synchronizing circuits for permitting the data link to be controlled by a clock signal within a computer, circuits for synchronizing the computer memories to permit accurate exchange of information through the data link, data link clock circuitry, load and interrogate circuits, error circuits and pulse generating circuits. The register may be made any desired length to accommodate the transfer of one, two or more computer words, depending on requirements.

The present invention may be used with other types of memories, such as a core memory. The external register may also be adapted for parallel transfer operations. In addition, other data links may be connected in parallel for the simultaneous transfer of more than one word at a time, where the computers employed are designed to process more than one word at a time, as in computers designed to address two or more memory locations at one time.

Other objects and advantages of the invention will become apparent from the following description taken in connection with the accompanying drawings in which:

FIG. 1 is presented on two sheets as FIGS. 1*a* and 1*b*;

Figure 1A:
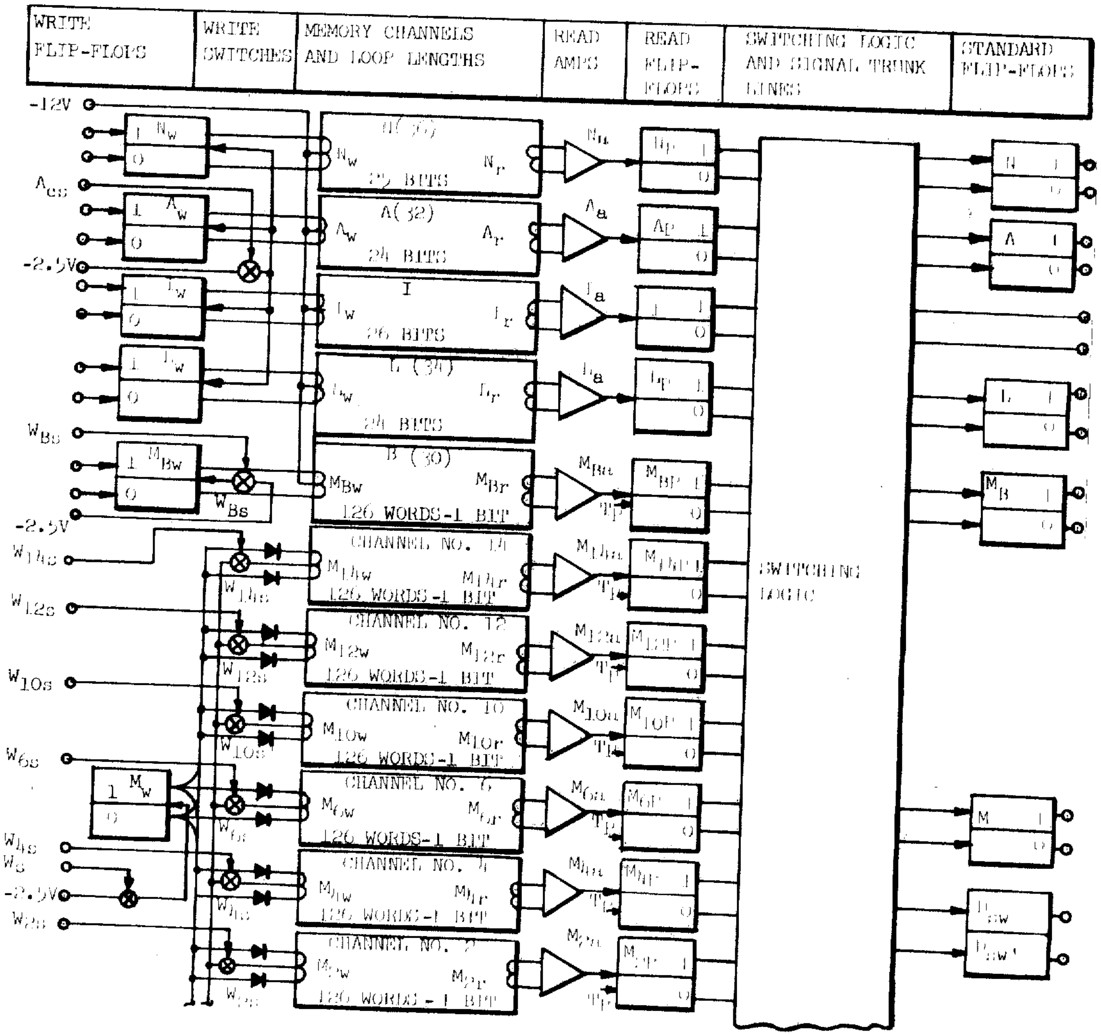
FIG. 1 is a schematic illustration of a portion of a disc-memory type digital computer which may be employed to practice the present invention for clarity.

FIG. 1 is an illustration of one embodiment of a digital data handling device. The illustration comprises a portion of a typical recirculating type memory, such as a disc memory for a digital computer. The portion designated as "memory channels and loop lengths" shows the organization of the memory into channels, each having 126 memory locations and a number of loops which function as shift registers. It should be understood that for the purpose of describing the present invention, a memory having 24 channels is illustrated, but obviously any number may be provided.

In the illustrative embodiment of the invention using a disc memory computer, a computer word is defined as 24 binary digits and each memory location may store one word and two timing pulses, $T_o$ and $T_p$. Reading from memory is accomplished by placing a small transducer called the read head near the surface of the disc (shown by the symbol for a coil connected to the read amplifiers), where it can detect stored binary signals which are then transmitted from the read head to an amplifier. Read heads are shown in FIG. 1 connected to separate amplifiers, such as a read head $M_{14r}$ connected to amplifier $M_{14a}$. A similar transducer, called the write head is associated with each read head, such as the write head $M_{14w}$ associated with the read head $M_{14r}$. Each write head is adapted to record information in a channel when current is caused to pass through its coil.

In FIG. 1 write heads are shown connected with flip flops $N_w$, $A_w$, $I_w$, . . . $X_w$, $X_{3w}$ and write switches $A_{cs}$, $W_{bs}$, . . . $Z_{3ws}$. These flip flops are actuated by other portions of the computer (not shown) such as the computation portion. Also shown are read flip flops connected in series with the read amplifiers such as flip flop $M_{14p}$ connected to read amplifier $M_{14a}$, switching logic, and other standard flip flops for use with other portions of the computer (not shown in FIG. 1), such as the arithmetic section or computation section having the capability for performing addition, subtraction, multiplication, division, etc. The individual subscript used in FIG. 1 are not essental to understanding the invention but are added merely for convenience.

The computer also has a capability for transferring data between loops functioning as arithmetic registers and the main memory channels while performing arithmetic operations. An arithmetic section of the type which may be used in connection with the memory illustrated in FIG. 1 is discussed generally by Montgomery Phister, Jr., in Chapter 9 of the Logical Design of Digital Computers, published in 1958 by John Wiley & Sons, Inc. Other portions of the computer, and techniques for programming are well known in the art and, therefore, are not described herein.

A special channel in the memory of FIG. 1, designated as clock channel C, is employed as the clock pulse source for synchronizing all operations in the computer. The pulse is amplified in amplifier $C_a$. It supplies pulses to the read and write amplifiers, computer flip flops and, in accordance with the present invention, to the transfer system for synchronizing the data link clock with the computer clock during either a load or interrogate operation.

Figure 4:
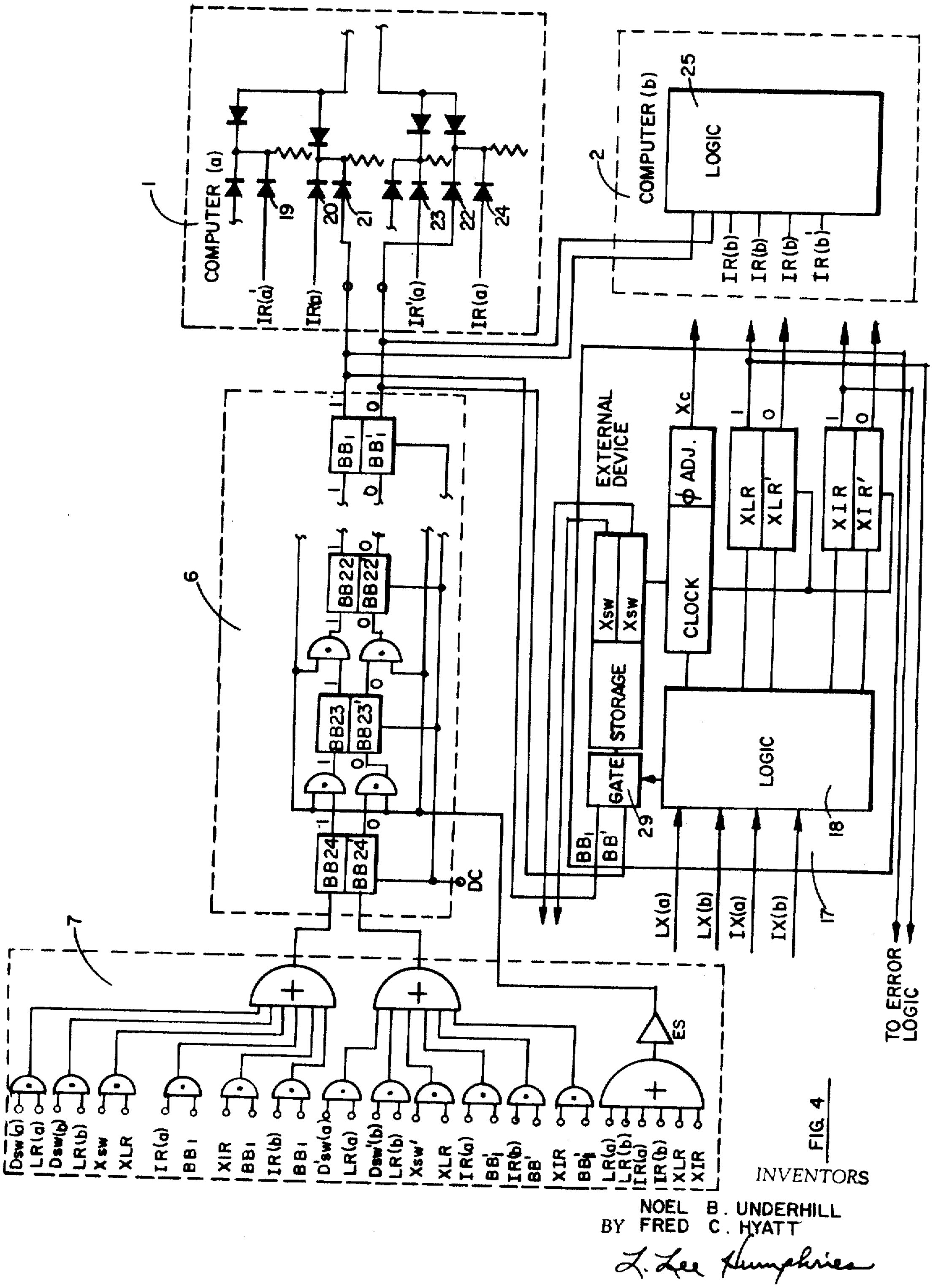
FIG. 4 is a logic diagram of the shift register and appropriate gating logic for exchanging information between data handling devices.

Also shown in FIG. 1, is the $D_{sw}$ flip flop which serves as an output from the computer to the data link system. Depending on the position of the switching logic as controlled by the program of the computer, $D_{sw}$ may load information from any of the memory locations shown into the data link register (FIG. 4).

Figure 2:
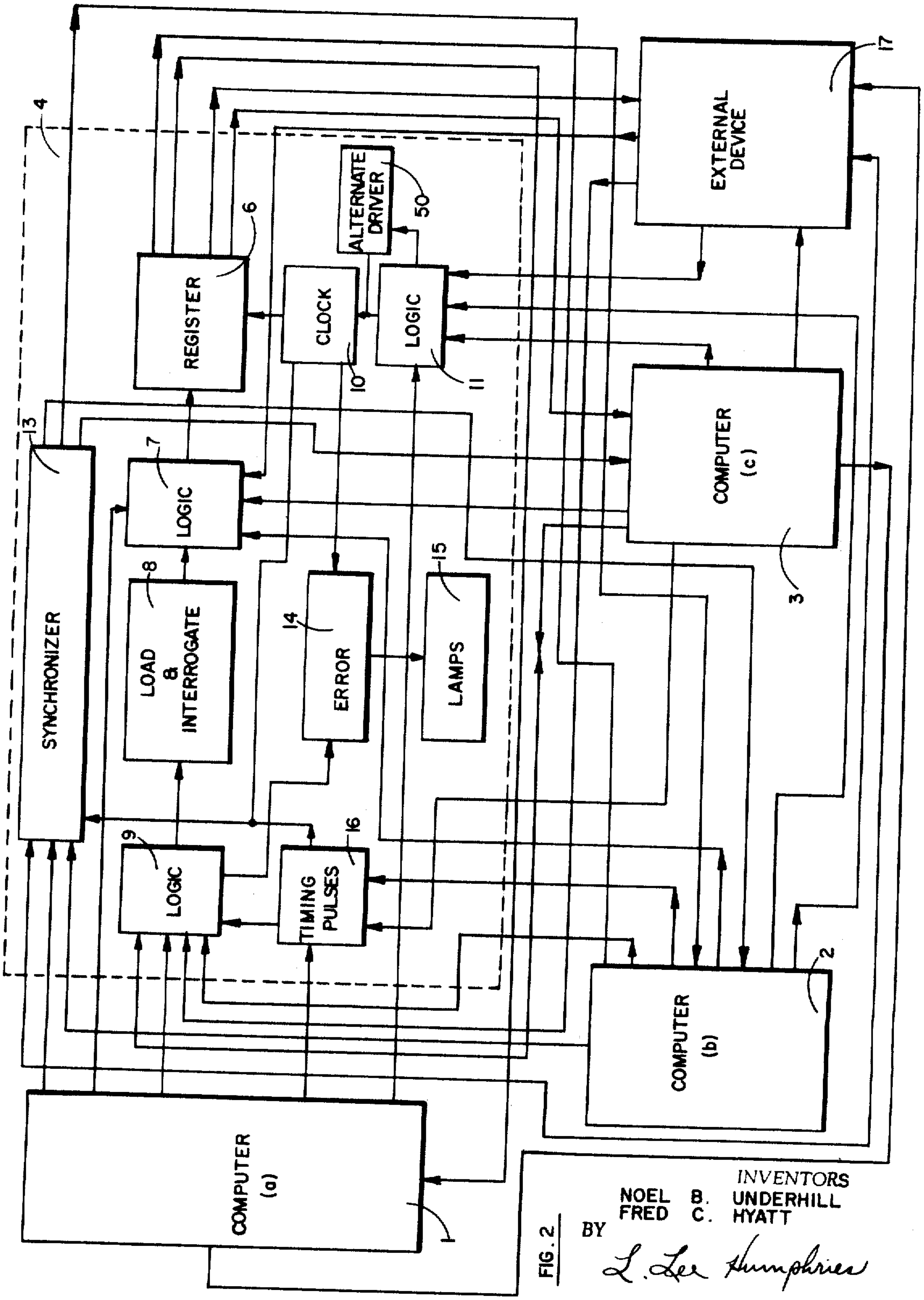
FIG. 2 is a simplified block diagram of a system of three computers and an external device interconnected by a data link for interchanging of information in accordance with the present invention.

In FIG. 2, digital computers *a*, *b* and *c* are interconnected by means of a data link or information transfer system 4. Additional computers may also be interconnected if appropriate modifications are made to system 4. The data link is comprised of shift register 6 and logic 7 for gating information into the register (FIG. 4), load and interrogate means 8 and logic 9 for controlling timing of information exchange between a computer and the system (FIG. 7), pulse generator means 16 for generating appropriate timing pulses for use by the load and interrogate portions of the system (FIG. 3), error logic means 14 and lamp means 15 for indicating conflicting commands (FIG. 6), data link clock means 10 and logic 11 for appropriately synchronizing the clock with the computer clock (FIG. 5), synchronizing means 13 for synchronizing the memories of the interconnected computers (FIG. 8).

Before initiating a system program, the computers are individually programmed so that each cooperates with the other computers to reduce computational time or increase capacity. For example, if a problem consists of addition, subtraction and multiplication, computer (*a*) may be programmed to add designated numbers, computer (*b*) may be similarly programmed to subtract designated numbers. If the sum to be obtained from the addition in computer (*a*) is needed by computer (*b*) before its programmed subtraction can be completed, computer (*a*) may be programmed to transmit the sum to register 6 of the data link from which it is received by computer (*b*).

Computer (*b*) is so programmed that at the time the information is to be received from the register 6 of the transfer system 4, the computation in computer (*b*) will have progressed to the point where the next computation to be performed in computer (*b*) requires the use of the sum from computer (*a*). Computer (*c*) is similarly preprogrammed so that if the difference computed by computer (*b*) is needed at some state of the computation in computer (*b*) that difference is transmitted thereto from computer (*b*) through the transfer system 4. Thus storage and computation capacity can be increased by the use of several computers joined in accordance with the present invention.

Also shown in FIG. 2 is external device 17 such as a magnetic tape unit for loading information into the data link at the command of any of the interconnected computers. For example, a computer may be programmed to activate a flip flop in the tape unit for loading information magnetically recorded on the tape into the data link register. A similar command may be employed for interrogating or loading information from the data link into the tape unit. More details are shown in FIG. 4.

FIG. 4 is a logic diagram of the portion of the computer information transfer system comprising register 6, logic gates 7 for setting flip flop $BB_{24}$ of the register including gating amplifier ES controlled by interrogate and load pulses, also shown are interrogate logic gates IR′ and IR for gating information from flip flop $BB_1$ into an interconnected computer. Logic network 7 for controlling the loading of information into $BB_{24}$ is connected to $BB_{24}$ flip flop of buffer 6. $BB_1$ flip flop is connected internally through gates IR and IR′ to the interconnected computers.

Although only computer (*a*) and computer (*b*) are shown in FIG. 4, it should be obvious by referring to FIG. 2 that more than two computers can be interconnected. For convenience, throughout the remainder of the description, only two computers are used.

Information from any one of the computers is entered into the $BB_{24}$ flip flop through $D_{sw}$ gate from $D_{sw}$ flip flop (FIG. 1). There is one $D_{sw}$ flip flop or similar output means in each interconnected computer.

Figure 5:
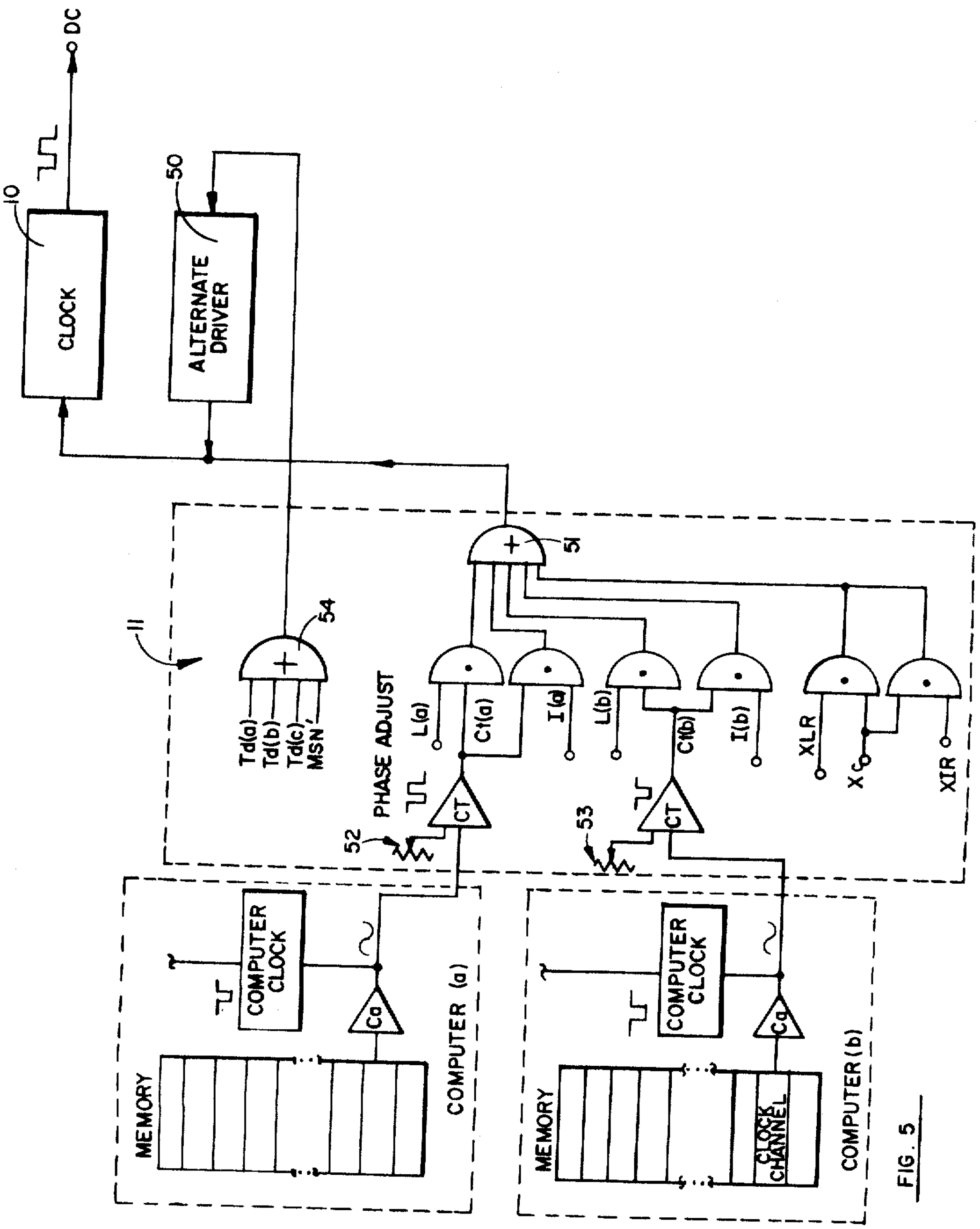
FIG. 5 is a diagram of the data link clock and a logic network for synchronizing the data link clock with the clocks in the interconnecting devices.

External device 17 such as a magnetic tape unit punched type unit, typewriter, etc. is shown interconnected with computers (*a*) and (*b*) through the register portion of the data link. $X_{sw}$ flip flop in device 17 is connected to a storage unit. In one embodiment, the interconnected computers are programmed to command the $X_{sw}$ flip flop to copy information from the storage unit into register 6. For example, if computer (*a*) is properly programmed at some portion of the program, the $LX_{(a)}$ generator is turned on which sets the XLR flip flop. Logic is included to insure proper setting of XLR by $LX_{(a)}$. Information is gated from the external device under the control of clock XC which may include a phase adjust and amplifier portion as shown in FIG. 5 for computers (*a*) and (*b*). When the XLR flip flop and the $X_{sw}$ flip flop are true at the same time, the register copies information from the external device. If it is desired at some point in a program to transmit information into the device from $BB_1$, then generator $IX_{(a)}$ is turned on which sets the XIR flip flop. Logic 18 inside device 17 similar to the logic seen for computers (*a*) and (*b*) (logic 25) is set by the XIR flip flop and information is read from $BB_1$ into the storage unit of device 17. Gate 29 enables the storage portion of device 17 for copying the $BB_1$ flip flop.

Flip flop $BB_{24}$ copies flip flop $BB_1$ at the same time that IR flip flop is true, if the register is being used to shift information into a computer. The information in the register thus recirculates and may also be shifted into another computer subsequently. Normally, 24 external clock pulses will cause a complete iteration and recycling of register information.

The register shifts the $BB_{24}$ information into $BB_{23}$ from which it is shifted into subsequent flip flops until the information is shifted into $BB_1$. Eventually it is loaded into a connecting computer or other external device and circulated simultaneously back to $BB_{24}$. Flip flop $BB_{23}$ copies $BB_{24}$, $BB_{22}$ copies $BB_{23}$, and the other flip flops copy preceding flip flops similarly during the presence of a gating signal from amplifier ES. The data link clock (DC) acts to synchronize transfers within the system. The flip flops in the system change states upon the presence of the clock signal.

If either the load register or the interrogate register pulses from any one of the interconnected computers are present, they are electronically or logically adjusted to proper time and duration and then power amplified by ES for gating information to the flip flops of register 6. When ES is true, information is gated from one flip flop to the succeeding flip flops of the register. ES insures proper circulation during interrogate commands and prevents overshifting of information during both load and interrogate commands. The data link clock (DC) gates the register in synchronization with the appropriate computer clock. For convenience, logic for register 10 is shown below only for a two computer embodiment, although it should be obvious that additional terms and appropriate gates could be added if more than two computers were interconnected. The subscript letters are notations for the computers (*a*) and (*b*) which are interconnected. Logic is also shown for the external device such as a tape unit, typewriter, card punch device, etc. which may be interconnected with the computer.

$$_1BB_{24}=(D_{sw}LR)_{(a)}+(BB_1IR_{(a)})+(D_{sw}LR)_{(b)}+(BB_1IR_{(b)})+(BB_1XIR)+(XLR\ X_{sw})$$

$$_0BB_{24}=(D_{sw}'LR)_{(a)}+(BB_1'IR_{(a)})+(D_{sw}'LR)_{(b)}+(BB_1'IR_{(b)})+(BB_1'XIR)+(XLR\ X_{sw}')$$

$$_1BB_{23}=BB_{24}ES$$

$$_0BB_{23}=BB_{24}'ES$$

$$_1BB_{22}=BB_{23}ES$$

$$_0BB_{22}=BB_{23}'ES$$

.
.
.

$$_1BB_2=BB_3ES$$

$$_0BB_2=BB_3'ES$$

$$_1BB_1=BB_2ES$$

$$_0BB_1=BB_2'ES$$

It may be necessary to modify a computer so that it can be used with the information transfer system. For example, operable modifications may be affected by adding logic gates 19, 20, 21, 22, 23, and 24 to each interconnected computer as shown in FIG. 4 to carry information from the register into one of any number of channels of the interconnected computer. Logic 25 shown for computer (*b*) is identical to the gates shown in more detail in the portion of computer (*a*) illustrated in FIG. 3. Gates IR and IR′ (19, 20, 23 and 24) are added to a computer if necessary to control the flow of information from register 6. When IR is true, it enables a word from the register to be written into some computer channel from BB1. When IR′ is true, it enables normal computer operation.

For convenience, register 6 is restricted to 24 bits represented by the states of 24 flip flops. The size of the register may be increased or decreased depending on the size of a particular computer word. Also several data links can be connected in parallel to form a different system embodiment, if appropriate logic changes are made inside each computer. In that way a plurality of computer words can be exchanged through the transfer system simultaneously.

Figure 10:
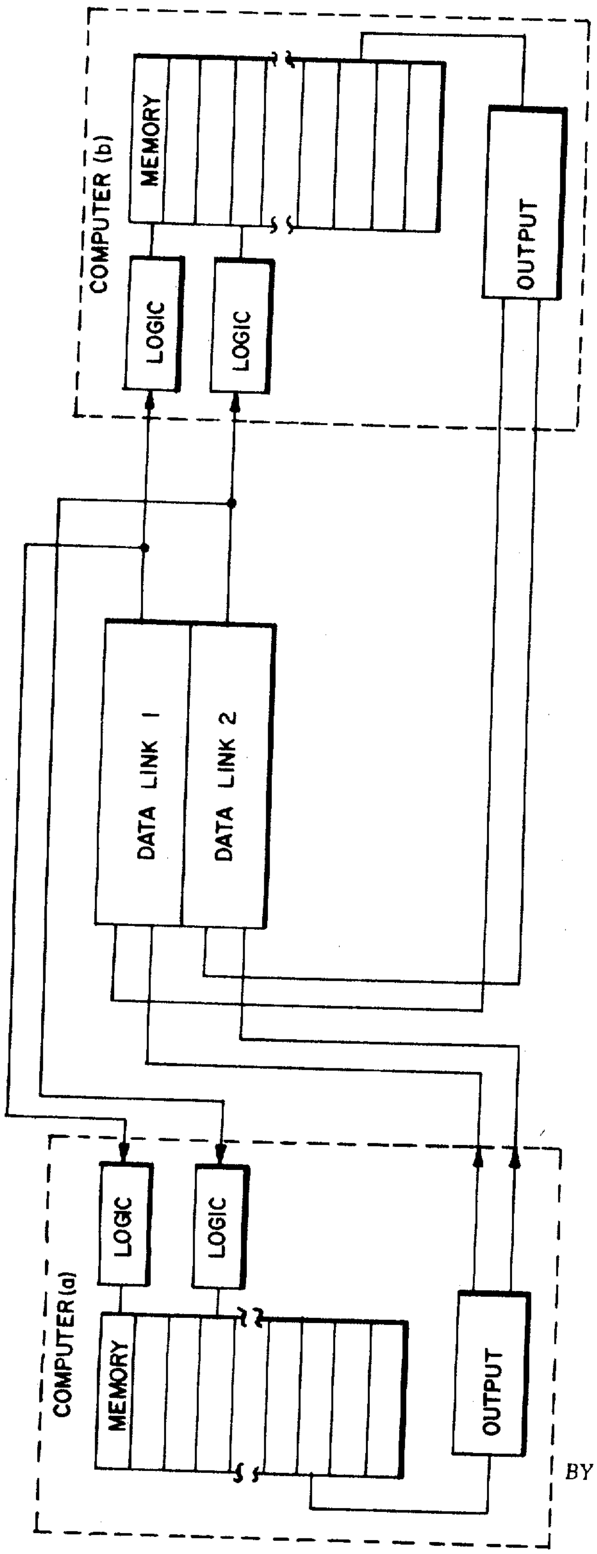
FIG. 10 is a simplified diagram of parallel connected registers and logic comprising a second embodiment of the present invention.

FIG. 10 is a block diagram illustration of a second transfer system embodiment comprised of a plurality of the first embodiment data link system connected in parallel so that information could be transferred between different channels of different computers simultaneously. For example, computer (*b*) may be transferring information into computer (*a*) while computer (*a*) is transferring information into computer (*b*) via the additional data link or links. The details relating to the first embodiment disclosed herein are applicable when connecting a plurality of data links in parallel.

Referring now to FIG. 5, an exemplary embodiment of a logic network is illustrated which may be used to generate a clock signal for gating flip flops in the transfer control systems. Logic 11 is connected to clock generator 10 which includes circuitry appropriate to achieve a suitable phase and amplitude signal DC for gating within the transfer control system. Generator 10 is a pulse generator triggered by a signal from gate 51 or a signal from alternate clock driver 50 which is triggered by a signal from "OR" gate 54.

A clock signal recorded in the clock channel of each interconnected computer, is connected to the logic 11 as shown in FIG. 5 for synchronizing the data link clock signal with each computer clock signal. For each computer there is provided an amplifier CT for appropriately preparing the signal from an amplifier CA in the computer, also shown in FIG. 1. The signal is modified by the amplifier CT to assume a suitable amplitude and shape for use in gating logic 11. For example, if the clock pulses DC derived from the clock generator 10 are not in phase with the computer clock of the computer (*a*), the clock pulses are adjusted to be in phase by adjusting a biasing potentiometer 52 and 53 for the CT amplifiers. When the data link is exchanging information with device 17 (FIG. 4), the data link clock is synchronized with the clock of XC device 17.

When the information is being received by another computer, the data link clock is synchronized with the clock of that other computer so that the data link system 4 (FIG. 1) is under control of the interrogating or loading computers during the respective modes of each computer. That is accomplished by the logic 11 in device 17 (FIG. 4). $L_{(a)}$, $L_{(b)}$, $I_{(a)}$, $I_{(b)}$ represent load and interrogate commands from the computer when the computers are exchanging information through the data link.

Logic for synchronizing a computer clock signal with the transfer or data link system clock signal is set forth below. DC is the designation for the data link clock. For convenience, the logic is limited to two computers and one external device, although it should be obvious that other gates may be added if other computers are interconnected. The term DC is not indicated in the logic for other portions of the multiple computer system in accordance with the procedure usually followed in logic descriptions. The clock term is frequently omitted from logic descriptions because it is understood to be part of each equation and, therefore, not necessary to include it. The data link clock is implicity part of the system, however. It should be understood that a clock signal must be present to insure synchronized execution of operations within the system.

$$DC=(CtL)_{(a)}+(CtI)_{(a)}+(CtL)_{(b)}+(CtI)_{(b)}+(XLR)(XC)+(XIR)(XC)$$

Also as shown in FIG. 5 is an alternate clock driver 50 for driving the clock generator 10 while any two of the interconnected computers are being synchronized. It generates a signal for triggering the clock generator 10 for generating a clock signal DC. The generator 10 is controlled by "OR" gate 54 and may be comprised of a combined oscillator and amplifier circuit, or similar circuitry well known in the art.

Prior to initiation of a programmed sequence in a computer, there is a delay until the computer registers, flip flops, counters, etc. are properly set. During the delay period, pulses are generated by the computers designated herein as $T_{da}$, $T_{db}$ or $T_{dc}$ which are used to trigger source 50. The search for proper synchronization between memories does not begin until the computers are in the operation mode, i.e., when the $T_d$ signals are all false. Thereafter, a flip flop $M_{sn}'$ (FIG. 8) is on until synchronization occurs. Therefore, if either $T_{da}$, $T_{db}$, $T_{dc}$ or $M_{sn}'$ are true, the data link clock will be generated by source 50 instead of a signal from logic 11. When memory synchronization is achieved, at a desired sector relationship, the flip flop $M_{sn}'$ is turned on. By then $T_{da}$, $T_{db}$ and $T_{dc}$ are also false because the computers are in an operation mode. From this point on, the clock generator 10 is then triggered by a signal from the logic network 11 during programmed commands.

Circuitry may be used to prevent more than one computer from attempting to control the clock generator 10 at the same time, the object being to arrange the programs of the interconnected computers so that only one of them controls the data link or transfer control system 4 (FIG. 2) at any one time.

Figure 6:
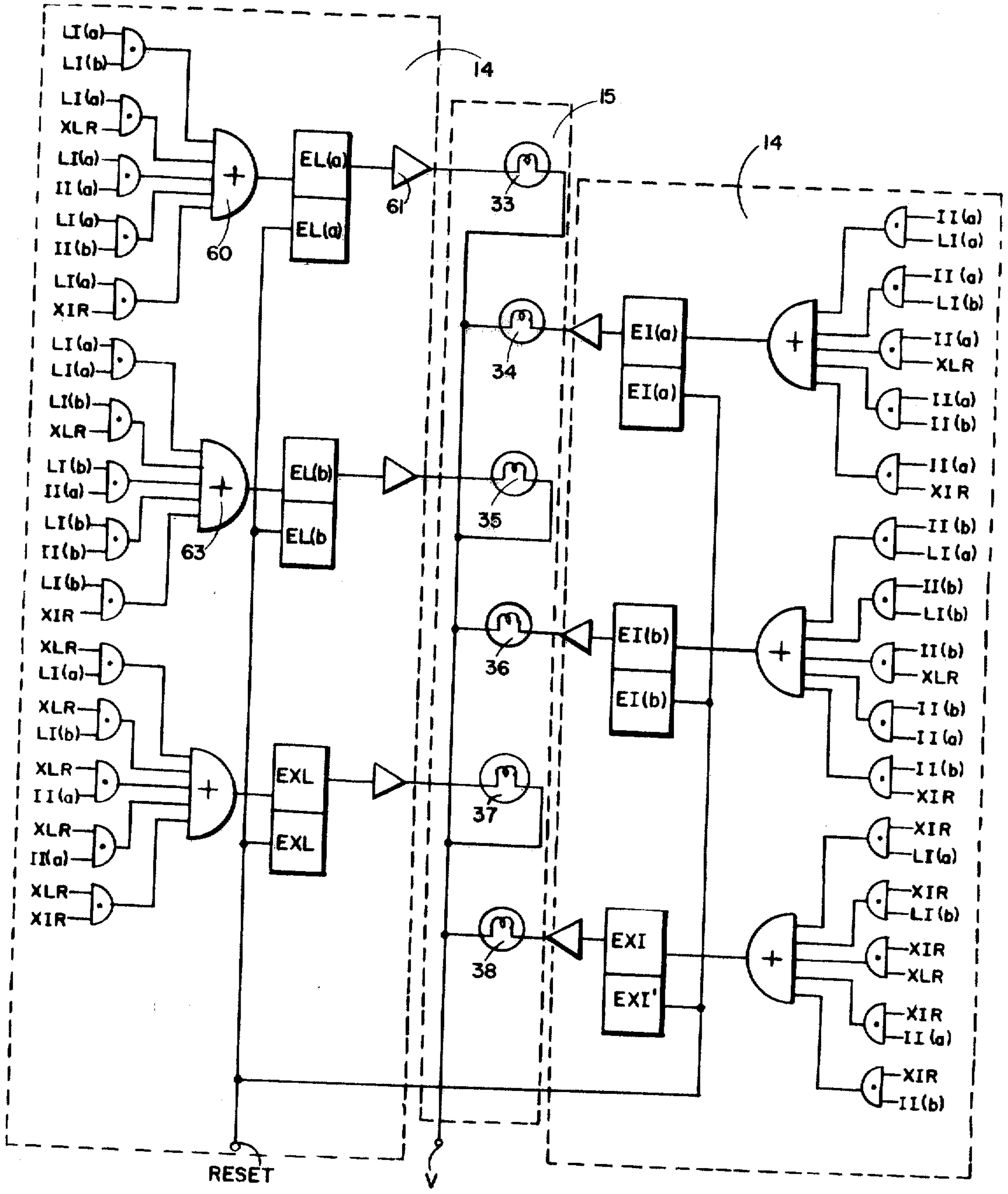
FIG. 6 is a diagram of error logic and lamps for indicating the source of conflicting commands.

Error circuitry shown in FIG. 6 may be used to enable a programmer to detect simultaneous conflicting commands received from the interconnected computers. In the event simultaneous conflicting commands are received, more than one gate becomes true and an indication of the source of conflicting commands is displayed to the programmer. Program corrections or adjustments are then made by the programmer. Such indicating means may be a light, as shown in FIG. 6. Logic for detecting simultaneous conflicting commands is shown below.

$$_1EL_{(a)}=(LI_{(a)}LI_{(b)})+(LI_{(a)}XLR)+(LI_{(a)}II_{(b)})+(LI_{(a)}XIR)+(LI_{(a)}II_{(a)})$$

$_0EL_{(a)}$=Reset $$_1EL_{(b)}=(LI_{(b)}LI_{(a)})+(LI_{(b)}XLR)+(LI_{(b)}II_{(a)})+(LI_{(b)}XIR)+(LI_{(b)}II_{(b)})$$

$_0EL_{(b)}$=Reset $$_1EXL=(XLRLI_{(a)})+(XLRLI_{(b)})+(XLRII_{(a)})+(XLRII_{(b)})+(XLRXIR)$$

$_0EXL$=Reset $$_1EI_{(a)}=(II_{(a)}LI_{(b)})+(II_{(a)}XLR)+(II_{(a)}II_{(b)})+(II_{(a)}XIR)+(LI_{(b)}II_{(b)})$$

$_0EI_{(a)}$=Reset $$_1EI_{(b)}=(II_{(b)}LI_{(a)})+(II_{(b)}XLR)+(II_{(b)}II_{(a)})+(II_{(b)}XIR)+(LI_{(b)}II_{(b)})$$

$_0EI_{(b)}$=Reset $$_1EXI=(XIRLI_{(a)})+(XIRLI_{(b)})+(XIRII_{(a)})+(XIRII_{(b)})+(XLRXIR)$$

$_0EXI$=Reset

A separate program is developed for use with each interconnected computer. Then the programs are checked to determine if there are conflicting commands which can interfere with a desired operation of the transfer system. One embodiment of a logic network for indicating program conflicts is shown in FIG. 6. The logic indicates errors in programming as well as errors which may occur due to some malfunction, etc. while the computers are executing the programs. Whenever there is a conflicting command, the source of the conflicting command is indicated by some means such as the lamps 33 through 38. For example, suppose two load commands are given simultaneously by a computer (*a*) and a computer (*b*). Under those conditions, "OR" gate 60 is true and $EL_{(a)}$ flip flop is turned on. The symbol E designates error. L and II indicate load or interrogate. X designates the external device. Amplifier 61, such as a lamp driver, supplies power to light lamp 33. At the same time "OR" gate 63 is true, $EL_{(b)}$ is turned on and lamp 34 is energized. No other lamps are lit. By proper labelling of the lamps, a programmer is immediately given an indication of the source of the conflicting commands and can interrupt the program and make whatever corrections are necessary. Afterwards, the reset line is energized and $EL_{(a)}$ and $EL_{(b)}$ are set false and remain false until conflicting commands are again received. Similar explanation is applicable for all possible combinations of conflicting commands indicated by the above error logic.

Figure 7:
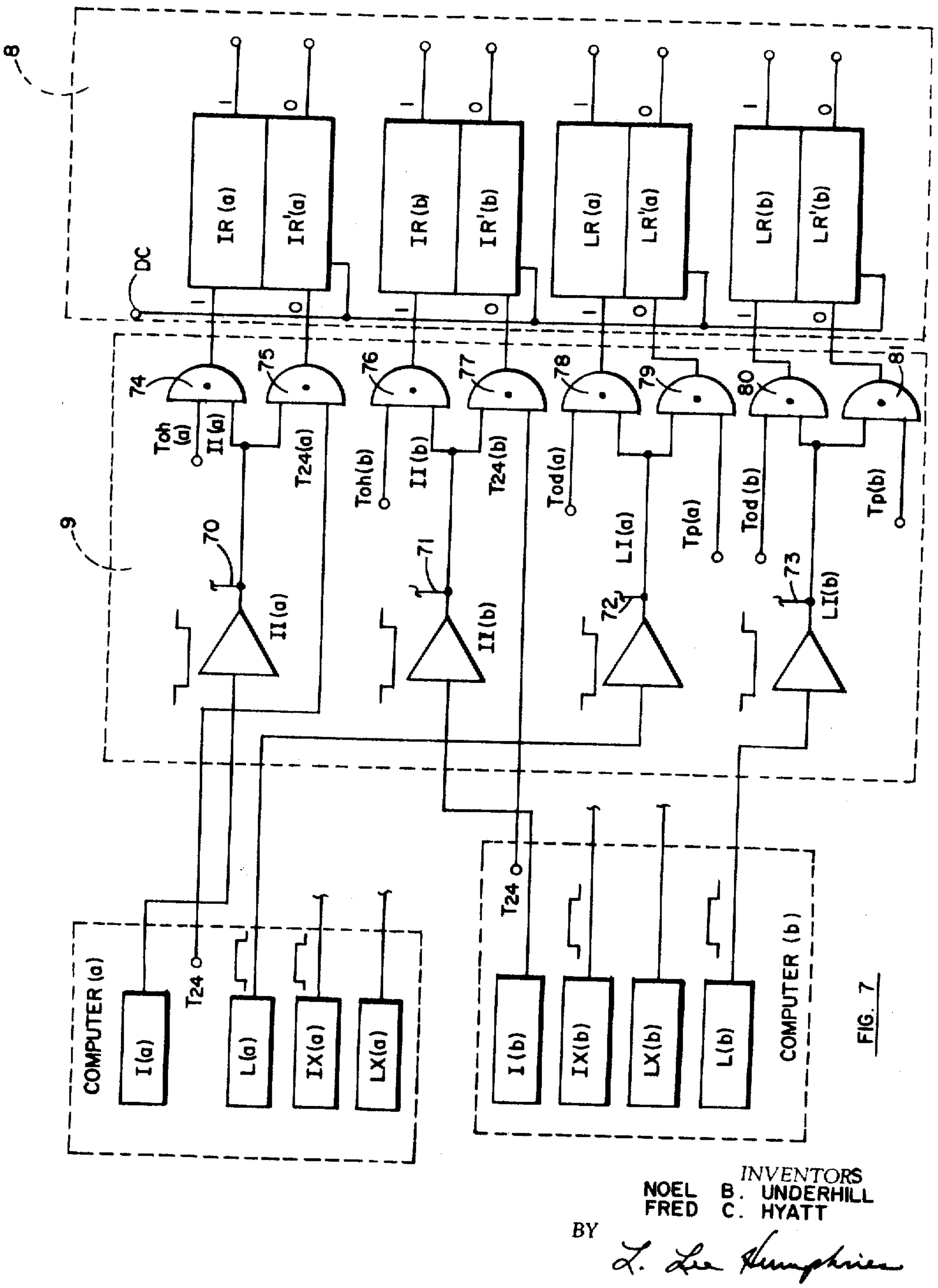
FIG. 7 is a diagram of a logic network for determining duration and timing of load and interrogate commands from interconnected devices.
Figure 8:
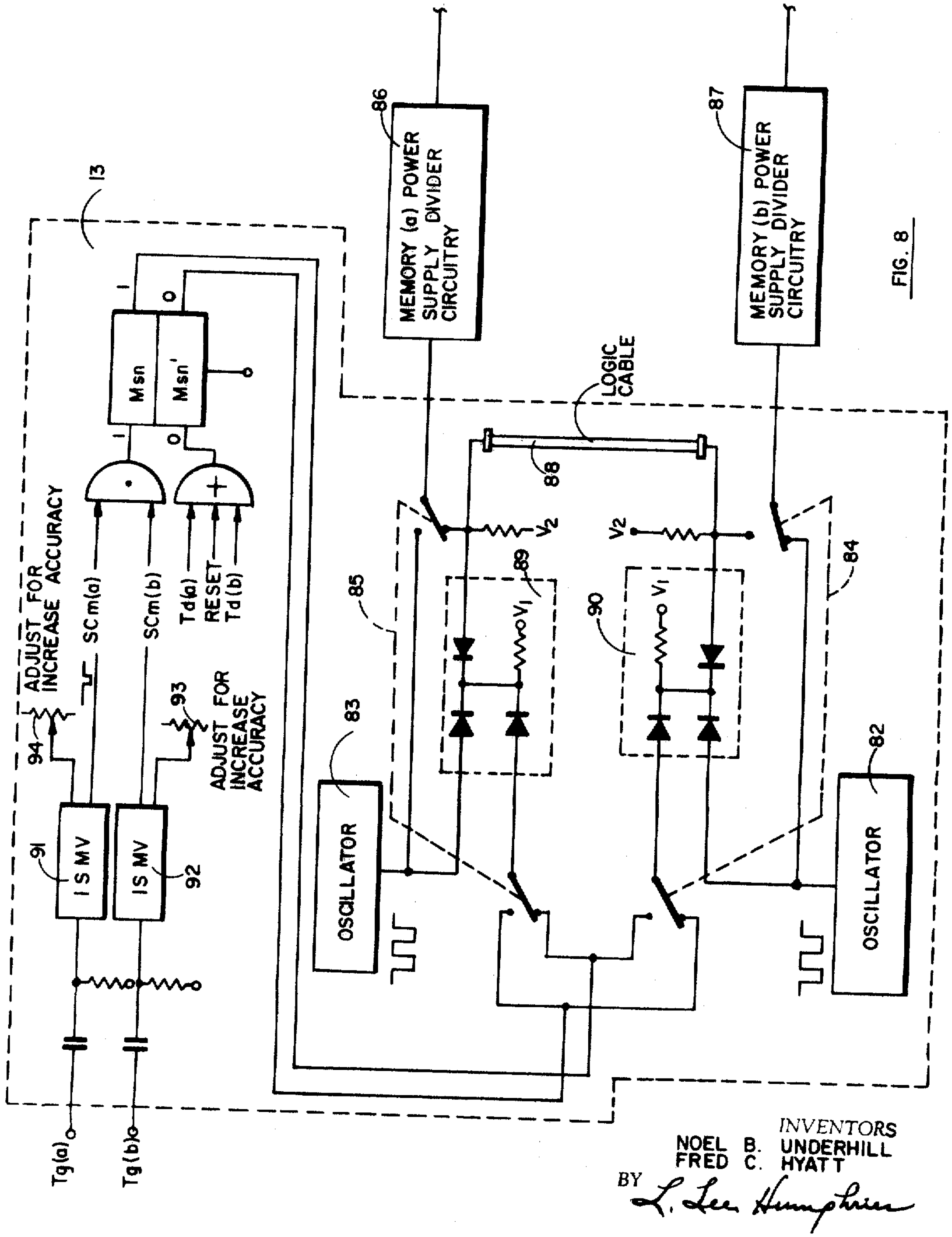
FIG. 8 is a diagram of logic network used to establish memory synchronization.

The signals LI and II for computers interconnected are taken from amplifiers II and LI shown in FIG. 7. Signals XIR and ILR are generated by the external device 17.

FIG. 7 is a logical diagram of flip flops, gates and signals necessary to drive gates referred to above in connection with FIGS. 4, 5 and 6. This portion of the information transfer system controls the flow of information between the register portion of the system and the computers interconnected thereby.

Load and interrogate portion 8 comprised of flip flops $IR_a$, $IR_b$, $LR_a$ and $LR_b$ are set true or false by logic 9 including amplifiers $II_a$, $II_b$, $LI_a$ and $LI_b$.

The amplifiers convert the signals from the computer into signals having proper voltage levels for driving the "AND" gates 74–81. The amplifiers invert the computer signals, hence, the designation, for example, of LI for load signal is inverted. Also shown in FIG. 7 at the outputs of amplifiers $II_a$, $II_b$, $IL_a$ and $IL_b$ are conductors connecting the amplifiers with the error logic (see FIG. 6).

The amplifiers of logic 9 are connected as inputs to "AND" gates 74–81. The other input to each gate is a timing pulse. Timing pulse $T_p$ is generated by the computer when the bit count of a word reaches bit 25. When LI and $T_p$ occur, the LR flip flop becomes false one bit later and BB24 does not copy $D_{sw}$ (see FIG. 1) until LR becomes true. As shown in FIG. 7, there are $T_p$ timing pulses generated by each interconnected computer. After LR flip flop becomes true one bit, LI and $T_{od}$ occurs and the BB24 flip flop (FIG. 4) copies information from the $D_{sw}$ flip flop (see FIG. 1) of a particular computer. $T_{od}$ is generated at bit time one by delaying $T_o$ (bit time zero) from the computer. Circuitry for delaying $T_o$ is shown in FIG. 8. For example, suppose computer (*a*) is programmed to load the register through the $D_{sw}$ flip flop. A command is executed by circuits within the computer and $L_a$ (FIG. 7) generates a pulse indicating a load operation. After amplification by $LI_a$, it becomes one input to "AND" gate 78. At the beginning of the next computer word, timing pulse $T_{o(a)}$ is delayed one bit and becomes $T_{od(a)}$, the second input to gate 78. This one bit delay is made in order to derive a pulse at T–1 time. A pulse at T–1 time is necessary to turn on the load gate "LR" at T–2 time which is the proper time for shifting in the first significant bit of the incoming word. When $LR_a$ becomes true, BB24 copies $D_{sw(a)}$. The copying begins at bit time two because of the one bit delay in the information from $D_{sw}$.

As indicated, the copying continues until one bit after $T_{p(a)}$ occurs. A similar explanation is applicable for $LR_b$. Load logic is set forth below. For convenience, logic for only two computers is shown.

$${}_1LR_{(a)}=T_{od(a)}LI_{(a)}$$
$${}_0LR_{(a)}=T_{p(a)}LI_{(a)}$$
$${}_1LR_{(b)}=T_{od(b)}LI_{(b)}$$
$${}_0LR_{(b)}=T_{p(b)}LI_{(b)}$$

Interrogation or copying from BB1 flip flop is handled in a like fashion. For example, $IR_{(a)}$ becomes true when $II_{(a)}$ and $T_{oh(a)}$ occurs at "AND" gate 74. $II_{(a)}$ is an amplifier output for converting signals from computer (*a*) into proper voltage form. Computer (*a*) commands $I_{(a)}$ to generate a pulse when according to a program it is to copy information from BB1. $T_{oh(a)}$ is bit time $T_{o(a)}$ from computer (a) (see FIGS. 3 and 9). One bit after "AND" gate 74 becomes true, gates 20 and 24 are true (see FIG. 4). Information from BB1 is copied into the computer location to which gates 21 and 22 are connected. When IR is true IR' is false so no other information can be copied into the particular location. At $T_{24(a)}$ bit time, "AND" gate 75 becomes true and $IR'_{(a)}$ is set true one bit later. $IR_{(a)}$ becomes false and computer (*a*) discontinues copying information from BB1. $T_{24(a)}$ is generated from the computer as a pulse indicating bit count 24.

Similar explanation is applicable to $IR_{(b)}$.

Interrogate logic is set forth below. For convenience, only logic for two computers is shown.

$${}_1IR_{(a)}=T_{oh(a)}II_{(a)}$$
$${}_0IR_{(a)}=T_{24(a)}II_{(b)}$$
$${}_1IR_{(b)}=T_{oh(b)}II_{(b)}$$
$${}_0IR_{(b)}=T_{24(b)}II_{(b)}$$

Figure 3:
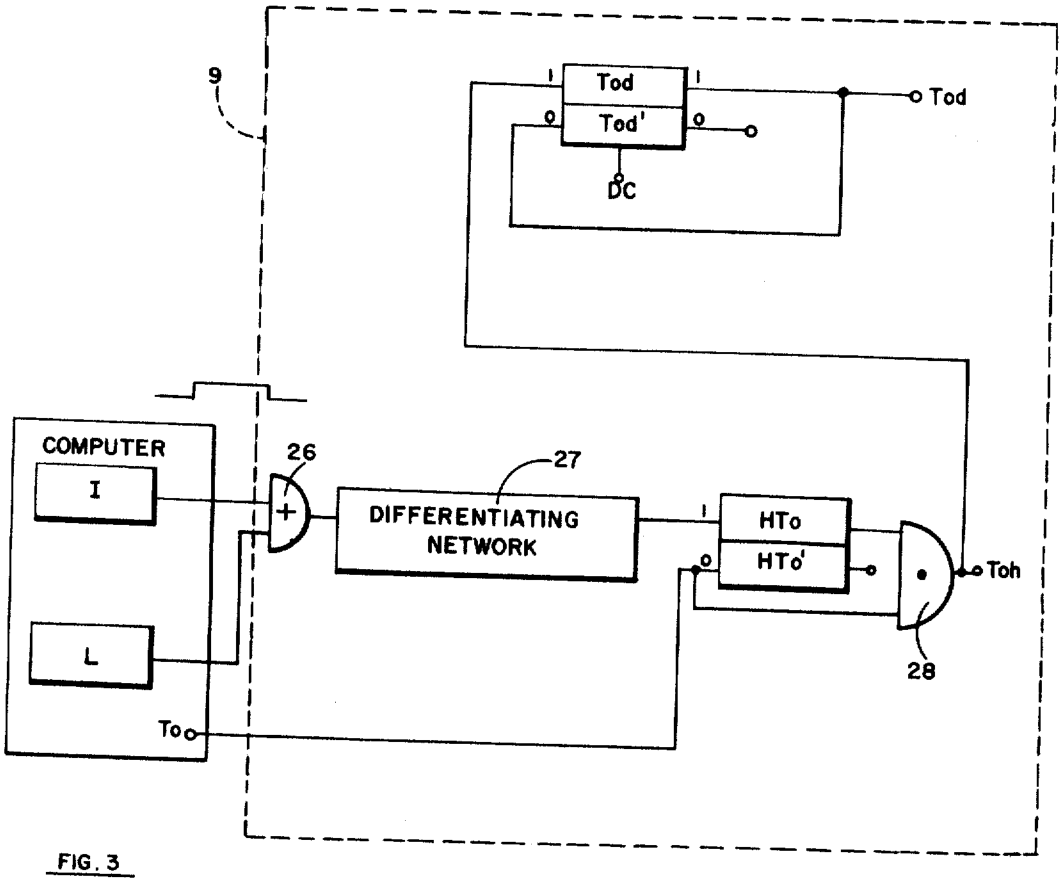
FIG. 3 is a diagram of a logic network for generating reference pulses for the load and interrogate circuits.

Referring now to FIG. 3, wherein is shown circuitry 16 for generating timing pulses $T_{od}$ and $T_{oh}$ for use with the load and interrogate logic (see FIG. 7). Although no subscript, such as computer (*a*) or computer (*b*) are shown, it is intended that the identical circuitry be included in the date link for each interconnected computer. When a computer is programmed to load or interrogate the data link, the I or L generator of that particular computer is turned on, and a pulse is generated (see FIGS. 7 and 10). If either an I or L pulse is generated by the computer, "OR" gate 26 is "one" and the pulse is differentiated by network 27. The sharp pulse resulting therefrom sets $HT_o$ flip flop true. When $HT_o$ is true and $T_o$ from the computer is also present, $T_{oh}$ is generated at $T_o$ bit time and is used with circuitry in FIG. 7. In order to delay the signal one bit time, the pulse from "AND" gate 28 is put through flip flop $T_{od}$. The output is $T_{od}$ which is $T_o$ delayed one bit. The I and L pulses must have a duration of at least 24 bits or one computer word. $T_{oh}$ occurs once during a computer command to initiate interruption of the data link register.

Figure 9:
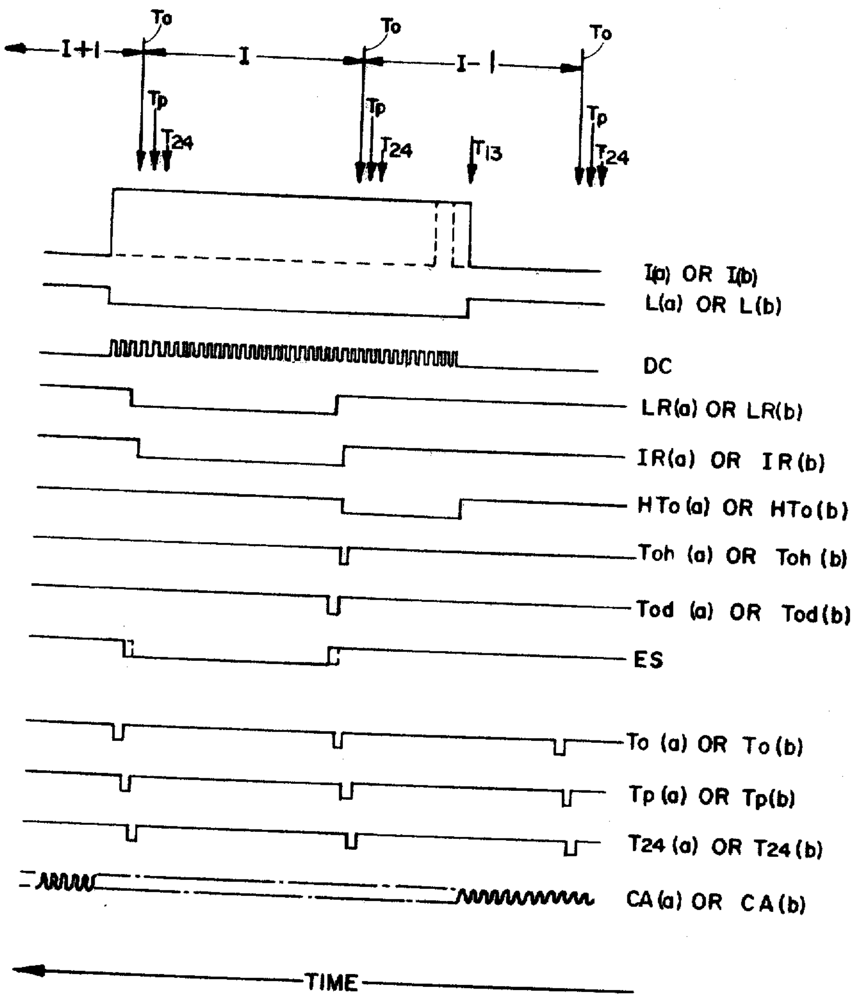
FIG. 9 is a timing diagram.

For an example of one co-related set of pulses used in loading and interrogating, see FIG. 9. The pulses are indicated for two interconnected computers although it should be obvious that the example applies as well to more than two computers.

$${}_1T_{od}=T_oHT_o$$
$${}_0T_{od}=T_{od}$$
${}_1HT_o=I$ or $L$ (at the initial occurrence after differentiation of the pulses)
$${}_0HT_o=T_o$$
$$T_{oo}=HT_oT_o$$

$I_{(a)}$ or $I_{(b)}$ is shown turned on at word minus one at $T_{13}$ time. It remains on until $T_2$ of word two time in order to complete transfer of information in word one from the register into the computer. The interrelation of pulses is shown. Amplifier ES is cut on by either an LR or IR pulse. The data link clock is cut on when an adjusted clock signal Ct (not shown) and an LR or IR pulse occurs. IR is cut on by $T_{oh}$ and I as modified. LR is similarly cut on in the presence of $T_{od}$ and L as modified. When $HT_o$ and $T_o$ occur at the same time $T_{oh}$ is generated. $HT_o$ is true when either an L or I pulse is generated by a computer. $T_{od}$ occurs one bit after $T_{oh}$. $T_o$, $T_p$, $T_{24}$ and $C_a$ are generated within the computer.

Subscript (*a*) and (*b*) are shown in FIG. 9 to indicate that the pulse could be from either interconnected computer depending on which computer had issued a command. Also, although only pulses from two computers are represented, it should be understood, as throughout, that more than two computers can be interconnected.

If timing pulses are not available in the interconnected computers, the pulses may be generated in the transfer system. Obviously, however, the computer must generate a pulse indicating an initiation of an exchange sequence. From such an initial pulse and the signal from the computer clock channel, the other timing signals shown in FIG. 10 can be derived by circuitry well known in the art.

For example, suppose $I_{(a)}$ or $I_{(b)}$ has the duration shown by the dotted line in FIG. 9. That pulse is insufficient as a timing pulse because certain of the other timing signals shown in FIG. 9 remain "on" only during $I_{(a)}$ or $I_{(b)}$. Therefore, in order to maintain a desired timing sequence within the transfer system, it is necessary to convert the dotted $I_{(a)}$ or $I_{(b)}$ signal into a pulse for a duration sufficient for maintaining the sequence of timing signal substantially as shown in FIG. 9. The dotted EI signal may be converted into a signal having a desired duration by means well known in the art, such as a multivibrator or a bit counter. So long as there is some signal from the computer which occurs prior to a desired load or interrogate operation from the computer, the remaining timing signals, for example, DC, $HT_o$, etc., can be generated. If the load register command in FIG. 9 is available in the transfer system and is turned on at the beginning of the word to be loaded into the register, then certain timing pulses may be eliminated altogether. The same is true for the interrogate register command and the turning off of both commands.

Flip flops, "AND," and "OR" gates which may be used in connection with the invention are described and illustrated in "Computer Having Floating Point Division," U.S. Ser. No. 227,366 filed Oct. 1, 1962. A description of a computer which may be used in the practice of this invention may be seen by referring to "Computer," U.S. Ser. No. 187,319 filed Apr. 13, 1962.

The preceding description of the computer information transfer system is valid only if the position of each one of the memories of the interconnected computers is synchronized at a predetermined phase relationship with respect to each memory of the other interconnected computers. For example, when using a disc computer, it is essential that the sector tracks of all computers agree sector for sector plus or minus a few bits. A computer word occupies one sector. FIG. 1 shows a sector channel Y having 126 words per revolution. Obviously a channel may have more or less words depending on the particular computer capacity.

For the particular embodiment illustrated herein, the computer memories are synchronized at some predetermined relationship at the outset by causing one disc to rotate at a different speed from the rotation of the disc of computer (*b*). This is achieved by varying the frequencies of the memory power supplies. The frequency of the memory power supplies control the disc rotation speed. One memory power supply is controlled by one crystal having one frequency slightly higher than that of the other power supply. After a lapse of, for example less than ten seconds, sector agreement will occur between the sector tracks of the two computers being synchronized. When that occurs, one of the individual crystal controlled power supplies controlling the memory rotation of one computer is switched to the control of a master crystal controlling the other power supply. It may be desirable to have a master crystal separate from both power supplies for controlling memory rotation after sector agreement has been reached. Since the memory motors are synchronous and since the power supplies causing the motors to rotate the disc are operated from the same crystal frequency standard, the discs remain synchronized word for word plus or minus a few bits due to particle, machine and other element tolerances.

FIG. 8 is an illustration of logic and circuitry 13 which may be used to synchronize memory discs. The circuitry shown may be located partially or totally in the respective computer memory power supplies or it may be totally or partially located within the transfer system. As discussed herein, it is intended to be included within the concept of the transfer system even though for a particular embodiment of the transfer system the synchronizing circuitry may be inside the respective power supplies. $T_g$ is a sync pulse generated by each computer which remains on for the duration of one computer sector and which occurs once during each disc revolution. Other synchronizing or timing pulses may be used depending on the particular computer involved.

The $T_g$ pulse may be caused to occur in one embodiment by storing a desired sector location in a computer register. A computer word indicating each sector is then compared with the desired location stored in a register. When there is coincidence, a flip flop is turned on for one word in duration. Therefore, for each revolution, a $T_g$ pulse occurs at a desired sector. A more detailed description of identifying a particular sector is contained in the above referenced application.

In another embodiment, prior to synchronization, a pulse of one word length may be recorded in a desired sector location. For example, in the Y channel (see FIG. 1). The other locations have no information recorded therein so that for each disc revolution, a one word pulse occurs.

If the sync pulse is generated at, for example, sector 1 by each computer then both computers will be synchronized at sector 1. If computer (*a*) generates the sync pulse at sector 2 and computer (*b*) generates a sync pulse at sector 5, then the computers will be synchronized likewise. Each time sector 2 of computer (*a*) passes a reference point, sector 5 of computer (*b*) passes a similar reference point. Pulse $T_g$ triggers one-shot multivibrators 91, 92 (shown as 1 S.M.V.) which in combination with adjust means 93 and 94 decrease the width of the $T_g$ pulse from say 1 word to 3 bits to increase the accuracy of the synchronization. Whenever there is coincidence, i.e., whenever the modified $T_{g(a)}$ and $T_{g(b)}$ pulses (designated as $S_{cm}$ pulses) occur at the same time, that is, at a desired sector agreement point, flip flop $M_{sn}$ is turned on so that the off-speed or slave crystal which was controlling the disc of computer (*b*) is switched out and the master crystal controlling computer (*a*) is switched in so that now the master crystal controls both power supplies.

In FIG. 8, one embodiment of means for achieving memory synchronization is shown. Oscillator 82 is driven by means of a master crystal having a frequency for example, 76.80 kc. Oscillator 83 is driven by means of a crystal designated as a slave crystal having a different frequency, for example, 76.8768 kc.

Switch means 84 and 85 are appropriately set so that the signals from the two oscillators are divided by circuitry means 86 and 87, well known in the power supply art, and used to drive power supply motors (not shown) which cause memory rotation in their respective computers. Logic cable 88 connects the synchronizing logic gates 89 and 90. When $M_{sn}$ becomes true, that is when there is the desired synchronization of the memories. "AND" gate 89 becomes false and "AND" gate 90 becomes true. After synchronization, the memory power supply of the computer designated as computer (*b*) is driven through cable 88 by the signal from oscillator 82 which keeps the computer synchronized.

It may be desirable at some point in the execution of a program of any one or all of the interconnected computers to re-synchronize the memories of the interconnected computers at a different phase or sector relationship. The computer sector selector switches are reset so that the pulse $T_g$ in each computer is caused to occur at the sector at which the computer memories are desired to be synchronized. In that case, $M_{sn}'$ flip flop is set to a true state by the reset switch shown in FIG. 8. Synchronization will occur and $M_{sn}$ will become true as indicated above. Logic for the synchronization is set forth below.

If three or four computers are interconnected, then the computer (*c*) memory $$_1M_{sn}=(S_{cm(a)})(S_{cm(b)})$$
$$_0M_{sn}=T_{d(a)}+T_{d(b)}+\text{Reset}$$

would be synchronized with computer (*a*) for the FIG. 8 embodiment, in a similar manner and so on until all computer memories of the interconnected computers are synchronized.

*Summary*

A plurality of digital data handling devices such as computer and external device such as tape units, typewriter systems, punched cards type systems, are interconnected through a computer information transfer system. When using computers, each is programmed so that information is transmitted by a first computer under the control of that first computer into the register portion of the computer information transfer system. Error detection logic prevents simultaneously conflicting commands from the interconnected device. The information is then shifted out of the register into a second computer or the first computer under the control of said second computer or first computer at a time as previously programmed into said second computer or first computer. Similar transfers may be made between all computers connected. In order to be able to program the plurality of computers so that information may be safely exchanged between the computers, the computers must first be synchronized so that computer (*a*) always maintains predetermined phase or word for word relationship with computer (*b*) and computer (*c*), etc., similarly for computers (*b*) and (*c*), etc. The computers may be synchronized so that the first word of computer (*a*) is synchronized with the first words of the other computers or the computer may be synchronized with the first words of the other computers or the computer may be synchronized so that one computer is synchronized with another computer at a different word to word relationship.

Although the invention has been illustrated and described in detail, it is to be clearly understood that the same is by way of illustration and example only and is not to be taken by way of limitation, the spirit and scope of this invention being limited only by the terms of the appended claims.

We claim:

1. In a system comprised of a plurality of computers, each of said plurality of computers having storage means for storing information in binary form, input means for reading information into a particular location of said storage means, means for generating a clock signal and other timing pulses, means for transferring information from said storage means to an output means; the improvement comprising, a transfer system for interconnecting said plurality of computers for selectively exchanging information between said computers, said transfer system comprising means connected for receiving information in the form of data from predetermined ones of said plurality of computers from the output means thereof, clocking means and means for synchronizing said clocking means with clock signals from said predetermined ones of said plurality of computer means when information is being received therefrom, said transfer system means including register means for storing said information, and further including means connected for transferring said information from said register means into an interrogating one of said plurality of computer means at the command of, and in synchronism with, said interrogating computer, and, means for preliminarily synchronizing said plurality of computers at a predetermined sector relationship with each other.

2. A digital information transfer system for interconnecting a plurality of digital data handling devices, each of said devices having a disc or drum rotatable memory for storing data words in sequential sector locations, said system comprising, in combination;

a temporary storage shift register of sufficient length to store at least one of said data words, means for loading said register with a data word from one of said devices at a rate controlled by said device, means for transferring data stored in said register to any one of said devices upon interrogation by said device, and at a rate controlled by said interrogating device.

3. A system as defined in claim 2 further comprising means for recirculating said data word in said register during each interrogation, to permit subsequent re-interrogation of the same data word.

4. A system as defined in claim 2 further comprising means for synchronizing said rotatable memory of said loading device with said rotatable memory of said interrogating device prior to transfer of data via said register.

5. A system as defined in claim 4 wherein said means for synchronizing comprises means, responsive to control signals from each of said loading and interrogating devices, for causing said memories to rotate with a predetermined sector relationship therebetween.

6. A system as defined in claim 4 wherein said means for synchronizing comprises means for providing power at the same frequency to each of said memories, thereby causing said memories to rotate at essentially the same rate.

7. A data link system for transferring digital data words stored in sequential sector locations of a disc or drum memory in a loading digital data handling device to a corresponding set of sequential sector locations in a disc or drum memory of an interrogating digital data handling device, said system comprising, in combination:

means for synchronizing said memories of said loading and interrogating devices comprising (a) means for rotating said memories at essentially the same rate, and (b) means for initializing said essentially simultaneous rotation at a predetermined sector relationship, a shift register of sufficient length to store at least one of said data words, means for loading said register with a data word from said memory of said loading device at a rate controlled by said loading device, means for transferring said stored data word from said register to said interrogating device at a rate controlled by said interrogating device, and means for recirculating said data word in said register during said interrogation.

References Cited

UNITED STATES PATENTS

| | | | |
|---|---|---|---|
| 2,946,986 | 7/1960 | Harrison | 340—172.5 |
| 3,061,192 | 10/1962 | Terzian | 235—157 |
| 3,208,049 | 9/1965 | Doty et al. | 340—172.5 |
| 3,214,739 | 10/1965 | Gountanis et al. | 340—172.5 |
| 3,219,980 | 11/1965 | Griffith et al. | 340—172.5 |
| 3,229,260 | 1/1966 | Falkoff | 340—172.5 |
| 3,238,506 | 3/1966 | Jung et al. | 340—172.5 |
| 3,242,467 | 3/1966 | Lamy | 340—172.5 |
| 3,247,488 | 4/1966 | Welsh et al. | 340—172.5 |
| 3,251,040 | 5/1966 | Burkholder et al. | 340—172.5 |
| 3,263,219 | 7/1966 | Brun et al. | 340—172.5 |
| 3,252,149 | 5/1966 | Weida et al. | 340—172.5 |

ROBERT C. BAILEY, *Primary Examiner.*

PAUL J. HENON, *Examiner.*